United States Patent [19]

Aiello et al.

[11] Patent Number: 4,634,860
[45] Date of Patent: Jan. 6, 1987

[54] DEVICE FOR DETERMINING THE POSITION OF A MOVING PART AND DRILLING MACHINE INCLUDING SUCH A DEVICE

[75] Inventors: Giovanni Aiello, Montereau; Jean-Pierre Hamelin, Boulogne, both of France

[73] Assignee: Soletanche, France

[21] Appl. No.: 604,073

[22] Filed: Apr. 26, 1984

[30] Foreign Application Priority Data

Apr. 28, 1983 [FR] France ................................. 83 07041

[51] Int. Cl.$^4$ ............................................. G01D 5/34
[52] U.S. Cl. .............................. 250/231 SE; 307/515; 328/133
[58] Field of Search ................... 175/45; 250/231 SE; 328/133; 340/347 P; 307/514, 515, 525

[56] References Cited

U.S. PATENT DOCUMENTS 4,308,500 12/1981 Avins ......................... 250/231 SE X
4,442,532 4/1984 Takemura ....................... 307/515 X Primary Examiner—Eugene R. LaRoche
Assistant Examiner—Steven J. Mottola
Attorney, Agent, or Firm—Guy W. Shoup

[57] ABSTRACT

A device for determining the position of a moving part, particularly to a device containing a sensor carried by the moving part and designed to supply two out-of-phase signals, each assuming alternately the value 0 or 1 as the sensor is carried in one or the other direction. The device also has means of supplying pulses (ZD), each of which corresponds to one step forward on the part of the sensor, when the sensor moves in one direction, means of supplying other pulses (ZC), each of which corresponds to said step forward, when the sensor moves in the other direction, an up-down counting unit, means of transmitting the second pulses to an upcounting input belonging to the up-down counting unit, means of transmitting the first pulses to a downcounting input belonging to the up-down counting unit when the unit is not at zero and of blocking the downcounting input to said first pulses when the up-down counting unit is at zero, and means of transmitting said first pulses to a consuming device when the up-down counting unit is at zero and of blocking the consuming device to said first pulses when the up-down counting unit is not at zero.

8 Claims, 6 Drawing Figures

DEVICE FOR DETERMINING THE POSITION OF A MOVING PART AND DRILLING MACHINE INCLUDING SUCH A DEVICE

This application claims the priority of French Application No. 83.07041, filed Apr. 28, 1983. The disclosure of the French priority application is herein expressly incorporated by reference thereto.

BACKGROUND OF THE INVENTION

The present invention relates to a device for determining the position of a moving part, particularly to a device containing a sensor carried by the moving part and designed to supply two out-of-phase signals, each assuming alternately the value 0 or 1 as the sensor is carried in one or the other direction.

Sensors of this type, generally involving a glass disk printed with opaque sections and rotated by the moving part between an electroluminescent diode, made out of gallium arsenide for example, and a phototransistor connected to a threshold amplifier that detects the transition from a transparent to an opaque zone, are known.

This type of sensor has a drawback in that, when the speed of rotation is very slow and the disk is more subject to vibration, anomalies will appear. Actually, when the position of the disk is such that the electroluminescent diode is at the transition from a transparent zone to an opaque zone, the threshold amplifier tends to oscillate, resulting in additional pulses that contaminate the results.

The present invention is intended to avoid this problem by using the fact that the two signals are out of phase and that, consequently, when one of the signals tends to oscillate because the associated electroluminescent diode is at the boundary between a transparent and an opaque zone, the other electroluminescent diode is either within an opaque zone or within a transparent zone and will accordingly supply a constant signal.

SUMMARY OF THE INVENTION

One object of the present invention is a device for determining the position of a moving part and containing both a sensor carried by the moving part and designed to supply two out-of-phase signals, each assuming alternately the value 0 or 1 as the sensor is carried in one or the other direction, the device also having means of supplying pulses (ZD), each of which corresponds to one step forward on the part of the sensor, when the sensor moves in one direction, means of supplying other pulses (ZC), each of which corresponds to said step forward, when the sensor moves in the other direction, an up-down counting unit, means of transmitting the second pulses to an upcounting input belonging to the up-down counting unit, means of transmitting the first pulses to a downcounting input belonging to the up-down counting unit when the unit is not at zero and of blocking the downcounting input to said first pulses when the up-down counting unit is at zero, and means of transmitting said first pulses to a consuming device when the up-down counting unit is at zero and of blocking the consuming device to said first pulses when the up-down counting unit is not at zero.

This object is attained in accordance with the invention in that the means of supplying said first pulses consist of means of applying the first signal (A) to the input of an ensemble of two monostable circuits (MA1 and MA2) with respective outputs QMA1 and QMA2, of means of applying the second signal (B) to the input of another ensemble of two monostable circuits (MB1 and MB2) with respective outputs QMB1 and QMB2, and of a logic circuit designed to supply an output signal ZD defined by the logical equations $$ZD = \overline{XA} \cdot \overline{YB}$$

or $$XA = (QMA1 \cdot \overline{B}) + (QMA2 \cdot B)$$

and $$YB = (QMB1 \cdot A) + (QMB2 \cdot \overline{A}).$$

A step forward on the part of the sensor corresponds in this particular case to a fraction or a multiple of the angular distance between two opaque zones or two transparent zones.

Obviously, when the sensor is carried along without vibrations, the first pulses will be transmitted to the consumer device. If, on the other hand, there are vibrations and the sensor oscillates or falls back, the first pulses will be blocked and the second pulses upcounted by the up-down counting unit. When the sensor starts to move forward again the first pulses will be downcounted down to zero in the up-down counting unit. The first pulses can then be transmitted again to the consumer device.

Said means of supplying the second pulses can alternatively consist of means of applying the first signal (A) to the input of an ensemble of two monostable circuits with respective outputs QMA1 and QMA2, of means of applying the second signal (B) to the input of another ensemble of two monostable circuits with respective outputs QMB1 and QMB2, and of a logic circuit designed to supply an output signal ZC defined by the logical equations $$ZC = \overline{YA} \cdot \overline{YB}$$

or $$YA = (QMA1 \cdot B) + (QMA2 \cdot \overline{B})$$

and $$XB = (QMB1 \cdot \overline{A}) + (QMB2 \cdot A).$$

Said means of transmitting or blocking the first pulses to the upcounting input of the up-down counting unit can for example consist of a NOR circuit with inputs connected to the outputs of said unit and an OR circuit with one input connected to the output of the NOR circuit, the other input connected to the output of the means of supplying the first pulse, and its output connected to the downcounting input of the up-down counting unit.

Said means of transmitting or blocking the first pulses to the consumer device can in turn consist of a NOR circuit with inputs connected to the outputs of the blocking-unblocking circuit and of a gate between the output of said means of supplying the first pulses and the input of the consumer device, with the control input of said gate being connected to the output of said NOR circuit.

Another object of the present invention is a drilling machine that includes a device of the aforesaid type for measuring the depth attained by its drilling tool.

A preferred embodiment of the invention will now be described with reference to the attached drawings, wherein

DETAILED DESCRIPTION OF THE PREFERRED EMBODIMENTS

Figure 1:
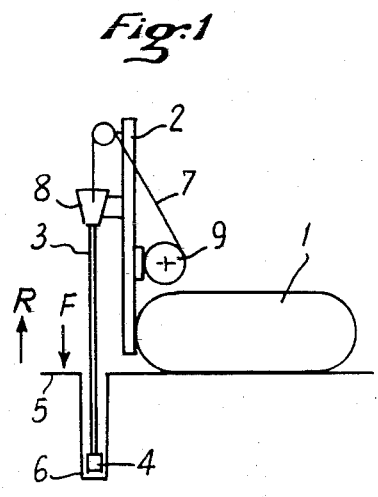
FIG. 1 is a schematic drawing of a drilling machine in accordance with the invention.

The machine illustrated in FIG. 1 consists of a body 1, mounted for example on caterpillar treads, that supports a guide 2 and accepts a rod train 3 with a tool 4 mounted at the bottom. A jack, not illustrated, exerts an up-and-down force on rod train 3 and means, also not illustrated, are provided for rotating the train. Thus powered, tool 4 drills a hole 6 in ground 5.

A cable 7 attached at one end to the head 8 of rod train 3 is wound at the other end onto the drum 9 of a winch. Drum 9 accommodates a sensor like that illustrated in FIG. 2. The sensor illustrated in FIG. 2 consists essentially of a transparent disk 10 mounted coaxially on drum 9. Transparent disk 10 has opaque zones 11 alternating with transparent zones 12 around its circumference. Two electroluminescent diodes 13a and 13b are positioned on one side of transparent disk 10 coincident with the course of opaque and transparent zones 11 and 12. Diodes 13a and 13b are angularly displaced such that, when one of the diodes is at the boundary between two zones the other will be more or less at the center of one of the zones adjacent to that boundary.

On the other side of transparent disk 10 and opposite diodes 13a and 13b are two phototransistors 14a and 14b that are sensitive to any light received from diodes 13a and 13b respectively through one of the transparent zones 12 on transparent disk 10. The output signals from phototransistors 14a and 14b are applied to the input of threshold amplifiers 15a and 15b respectively. The output signals A and B from threshold amplifiers 15a and 15b are applied to the inputs of the circuit illustrated in FIG. 3.

Signals A and B have the logical value 1 when the corresponding diode is opposite a transparent zone 12 and the logical value 0 when it is opposite an opaque zone 11.

Figure 3:
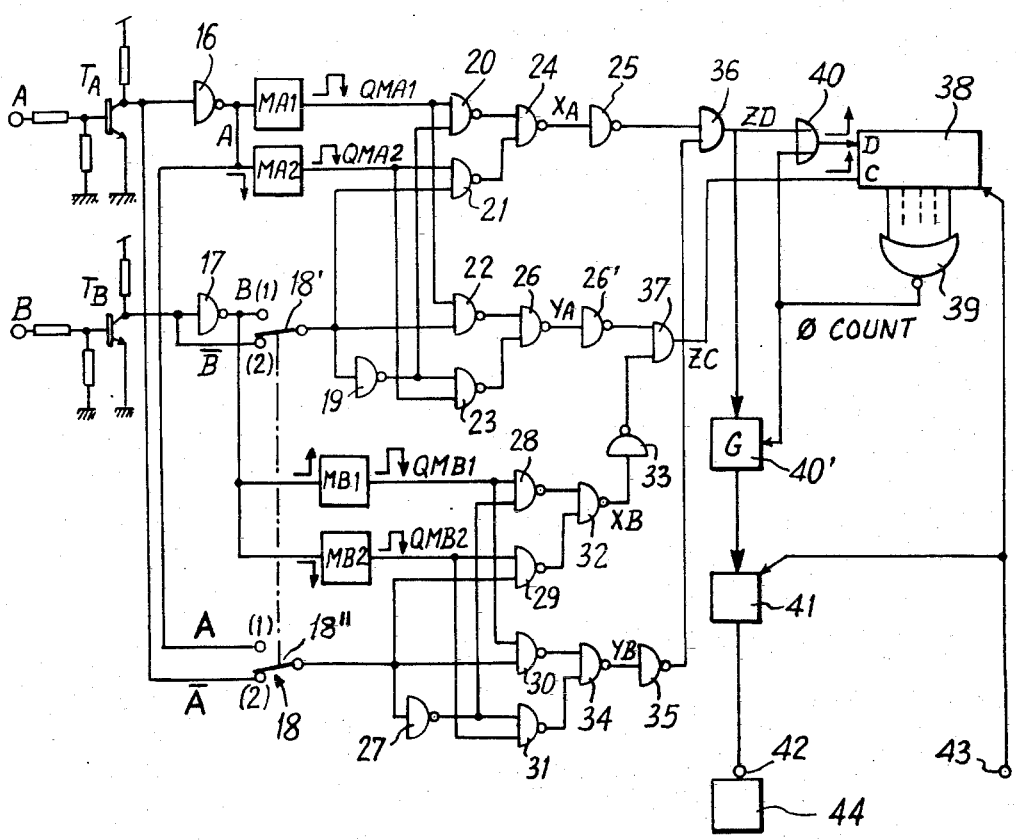
FIG. 3 is a circuit diagram of the device in accordance with the invention.

Signal A is applied to one circuit channel illustrated in FIG. 3 through an adaptation stage essentially involving a transistor TA. The output of transistor TA is inverted by a NOT gate 16, the output from which is applied to the inputs of two monostables MA1 and MA2.

Monostable MA1 is designed to supply a pulse from its output QMA1 to a rising front of the signal A applied to its input. Monostable MA2 is designed to supply a pulse from its output QMA2 to a descending front of the signal A applied to its input.

Signal B is similarly applied to the input of the circuit illustrated in FIG. 3 through an adaptation stage involving a transistor TB, the output of which is inverted by a NOT gate 17. The output B of NOT gate 17 is applied to one of the channels of one of the elements 18' of a double two-way switch 18. The other channel of element 18' receives the signal from the output $\bar{B}$ of transistor TB. The output from element 18' is inverted by a NOT gate 19.

A NAND gate 20 receives the output signal QMA1 from monostable MA1 at one of its two inputs and the output signal from NOT gate 19 at the other. A NAND gate 21 receives the output signal QMA2 from monostable MA2 at one of its inputs and the output signal from element 18' of two-way switch 18 at its other. A NAND gate 22 receives the output signal QMA1 from monostable MA1 at one of its inputs and the output signal from element 18' at the other. Finally a NAND gate 23 receives the output signal from NOT gate 19 at one of its inputs and the output signal QMA2 from monostable MA2 at the other.

A NAND gate 24 receives the output signal from NAND gate 20 at one of its inputs and the output signal from NAND gate 21 at the other, and its output XA is inverted by a NOT gate 25. A NAND gate 26 receives the output from NAND gate 22 at one of its inputs and the output from NAND gate 23 at the other, and its output YA is inverted by a NOT gate 26'.

The second channel of the circuit in FIG. 3 is similar to the first channel just described.

The second element 18" of double two-way switch 18 receives signal A at one channel and signal $\bar{A}$ at the other.

Signal B is applied to the inputs of two monostables MB1 and MB2. Monostable MB1 is designed to supply from its output QMB1 a pulse to a rising front of its input B and monostable MB2 is designed to supply at its output QMB2 a pulse to a descending front of its input signal B.

The output from element 18" is inverted by a NOT gate 27.

A NAND gate 28 receives the output signal QMB1 from monostable MB1 at one input and the output signal from NOT gate 27 at the other. A NAND gate 29 receives the output signal QMB2 from monostable MB2 at one input and the output signal from element 18" at the other. A NAND gate 30 receives the output signal QMB1 from monostable MB1 at one input and the output signal from element 18" at the other. Finally, a NAND gate 31 receives the output signal from NOT gate 27 at one input and the output signal QMB2 from monostable MB2 at the other.

A NAND gate 32 receives the output signal from NAND gate 28 at one input and the output signal from NAND gate 29 at the other. A NAND gate 34 receives the output signal from NAND gate 30 at one input and the output signal from NAND gate 31 at the other.

The output signal XB from NAND gate 32 is inverted by a NOT gate 33 and the output signal YB from NAND gate 34 is inverted by a NOT gate 35.

The outputs from NOT gates 25 and 35 are applied to the inputs of an AND gate 36 and the outputs from NOT gates 26' and NOT gate 33 are applied to the inputs of an AND gate 37.

If the signal S is generally designated S (1) when double two-way switch 18 is in position 1 and S (2) when double two-way switch 18 is in position 2, and if the output from AND gate 37 is designated ZC and the output from AND gate 36 ZD, the logical equations $$XA\ (1) = (QMA1 \cdot \bar{B}) + (QMA2 \cdot B)$$

$$XA\ (2) = (QMA1 \cdot B) + (QMA2 \cdot \bar{B})$$

$$YA\ (1) = (QMA1 \cdot B) + (QMA2 \cdot \bar{B}) = XA\ (2)$$

$$YA\ (2)=(QMA1\cdot\bar{B})+(QMA2\cdot B)=XA\ (1)$$

$$XB\ (1)=(QMB1\cdot\bar{B})+(QMB2\cdot A)$$

$$XB\ (2)=(QMB1\cdot A)+(QMB2\cdot\bar{A})$$

$$YB\ (1)=(QMB1\cdot A)+(QMB2\cdot\bar{A})=XB\ (2)$$

$$YB\ (2)=(QMB1\cdot\bar{A})+(QMB2\cdot A)=XB\ (1)$$

$$ZD\ (1)=\overline{XA}\ (1)\cdot\overline{YB}\ (1)$$

$$ZD\ (2)=\overline{XA}\ (2)\cdot\overline{YB}\ (2)$$

$$ZC\ (1)=\overline{YA}\ (1)\cdot\overline{XB}\ (1)$$

$$ZC\ (2)=\overline{YA}\ (2)\cdot\overline{XB}\ (2)$$

will be immediately obvious from the logical diagram for FIG. 3.

The output signal ZC from AND gate 37 is applied to the upcounting input of an up-down counter 38. Each of the outputs from up-down counter 38 is applied to one of the inputs of a NOR gate 39. The output from NOR gate 39 is applied to one of the inputs of an OR gate 40. The other input of OR gate 40 receives the output signal ZD from AND gate 36. The output from OR gate 40 is applied to the downcounting input of up-down counter 38.

The output from NOR gate 39 is also applied to the control input of a gate 40' that can function in a following mode when its control input is at 1 and in a memory mode when its control input is at 0. Since the input to gate 40' is connected to the output of AND gate 36, it receives signal ZD. When gate 40' is in the following mode its output is identical to its input and when gate 40' is in the memory mode its output maintains a constant value.

Finally the output from gate 40' is applied to the input of a four-way divider 41, the output from which is applied to the input 42 of the consuming device 44. A zeroing signal applied to the input terminal 43 allows both up-down counter 38 and four-way divider 41 to be returned to zero.

The function of the circuit illustrated in FIG. 3 will now be described with reference to FIGS. 4 through 6.

Figure 4:
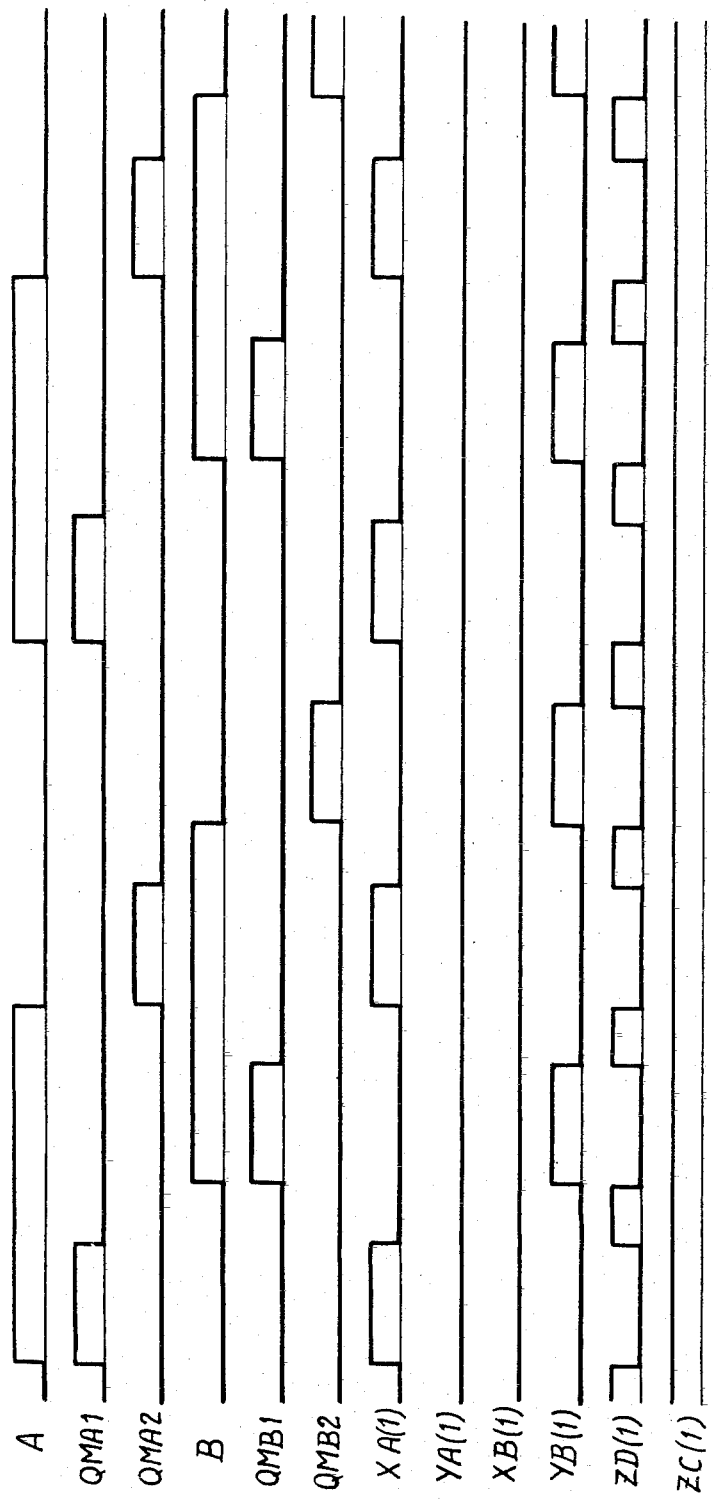
FIGS. 4, 5, and 6 illustrate the signals that occur in the circuits illustrated in FIG. 3 in three different cases.
Figure 5:
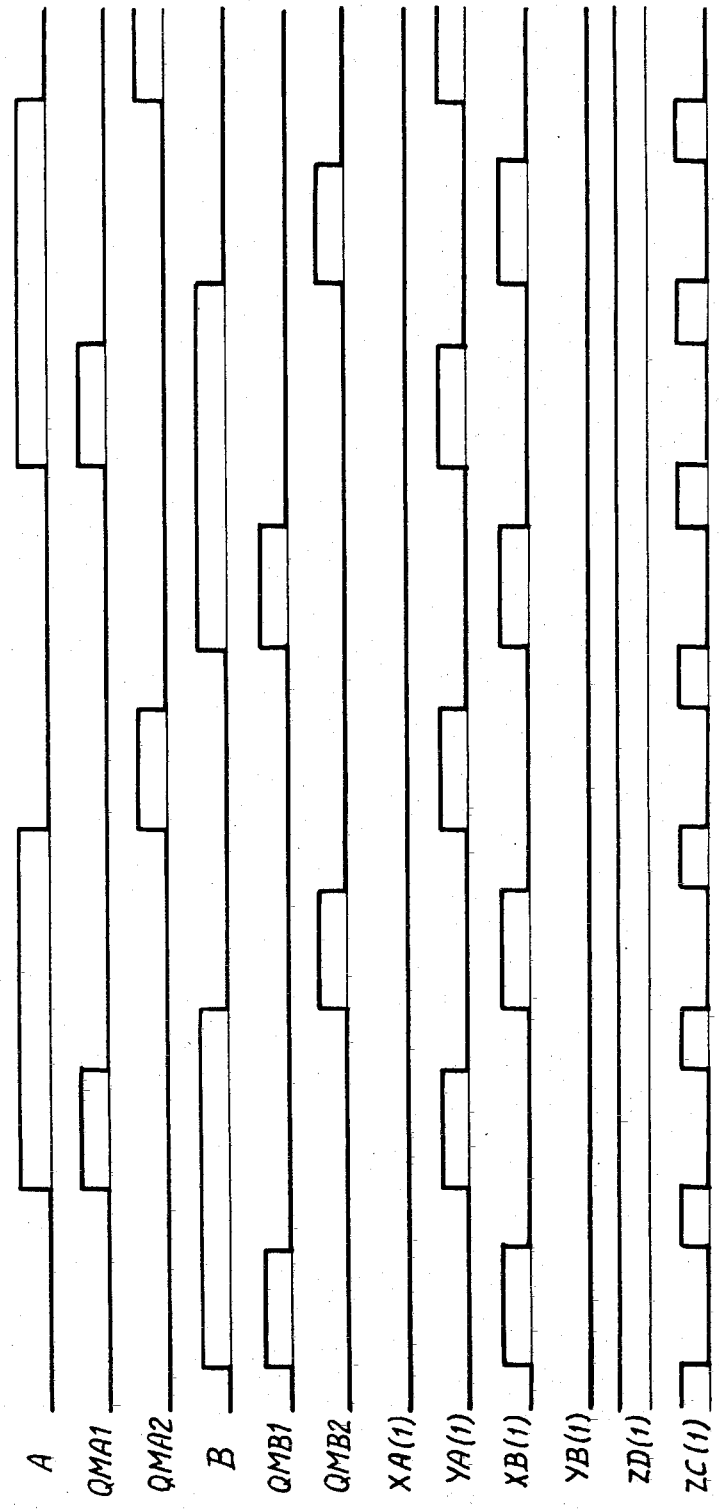
Figure 6:
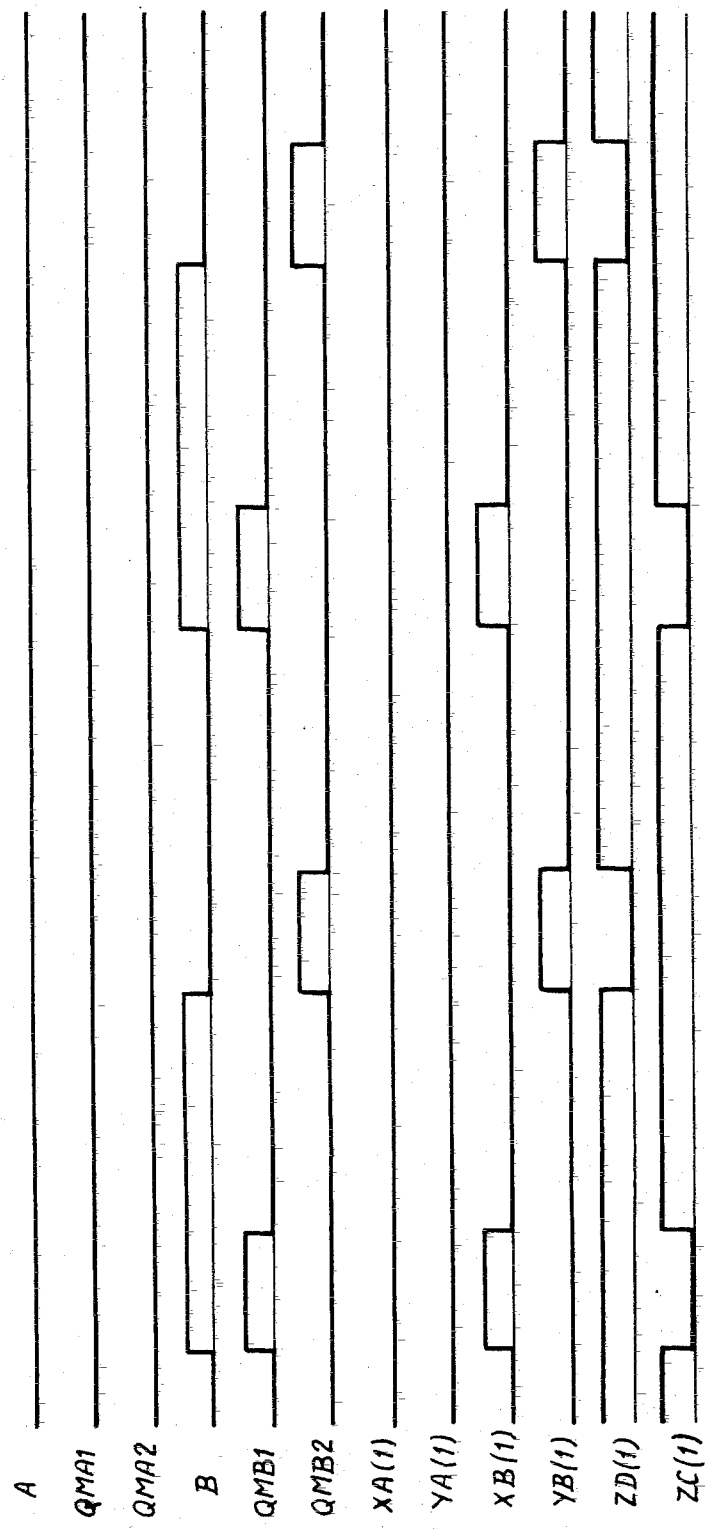

FIGS. 4 through 6 illustrate the aforementioned signals during different modes of function when double two-way switch 18 is in position 1. Switch 18 is positioned when the device is installed in the machine such that, subsequent to zeroing, pulses will appear at consuming device 44 when rod train 3 moves in the direction indicated by arrow F in FIG. 1 and the disk is rotated in the direction indicated by arrow F1 in FIG. 2. As indicated by the above logical equations, this function is identical when the machine is being freed, when, that is, the rod train is moving in the direction indicated by arrow R in FIG. 1 and disk 10 is being rotated in the direction indicated by arrow R1 in FIG. 2. Double two-way switch 18 is in position 2 at that time.

FIG. 4 illustrates the signals referred to in FIG. 3 when the machine is engaged in a normal drilling operation with neither reversing nor vibrations.

Signals A and B are obviously out of phase, with pulses QMA1 at the rising fronts of A, pulses QMA2 at the descending fronts of A, pulses QMB1 at the rising fronts of B, and pulses QMB2 at the descending fronts of B.

Signals XA (1), YA (1), XB (1), and YB (1) will be directly evident from the diagram in FIG. 3 and from the aforesaid logical equations. Obviously, XA (1) will generate pulses at each rising or descending front of A, YB (1) will generate pulses at each rising or descending front of B, and YA (1) and XB (1) will equal zero.

ZC (1) will accordingly always equal 1 and ZD (1) will generate a pulse for each rising or descending front of A or B, four pulses, that is, for each corresponding period of A or B. ZD (1) will accordingly always generate four pulses for each forward step of tool 4, from for example the commencement of one opaque zone 11 to the commencement of the following opaque zone.

Referring now to the diagram in FIG. 3 it will be evident that, if zeroing 43 has been activated and if the drilling phase is similar to that illustrated in FIG. 4, up-down counter 38 will be at zero whereas the output from NOR gate 39 will be at 1. On the one hand, consequently, the output from OR gate 40 will be at 1 no matter what the state of signal ZD, so that the downcounting input of up-down counter 38 will be blocked and, on the other, gate 40' will be unblocked, so that pulses ZD will pass through it, will be divided in four by gate 41, and will then be transmitted to consuming device 42, which will consequently have a pulse available for each step that the tool advances.

Since the upcounting input of up-down counter 38 that signal ZC is applied to remains equal to 1, up-down counter 38 will remain equal to zero. This mode of functioning will accordingly continue as long as the tool neither reverses nor vibrates.

If the tool is reversed during the drilling operation for any reason whatever, with disk 10 rotating backwards but with switch 18 remaining in position 1, the state illustrated in FIG. 5, in which signals A and B are out of phase in a direction the reverse of that illustrated in FIG. 4, will occur.

Signals QMA(1), QMA(2), QMB(1), QMB(2), XA(1), YA(1), XA(1), XB(1), and YB(1) can be similarly deduced from the above equations.

It will evident on the other hand that now ZD(1) will be equal to 1, whereas ZC(1) will generate four pulses for each period of A or B.

Referring now to FIG. 3, it will be evident that, as soon as the first pulse appearing at the output of AND gate 37, up-down counter 38 will begin to upcount in such a way that its output will assume a non-zero value. The output from NOR gate 39 will then equal zero, blocking port gate 40'. The downcounting input of up-down counter 38 will on the other hand be unblocked by OR gate 40.

When, once a certain number of pulses has appeared at the upcounting input of up-down counter 38, the tool reassumes drilling, the case illustrated in FIG. 4 will occur again. Pulses will appear at the input to OR gate 40 and will be transmitted to the downcounting input of up-down counter 38 because the output from NOR gate 39 is at zero. On the other hand, because this output is at zero, gate 40' will be blocked, so that pulses ZD will not be transmitted to consuming device 42.

This state continues until up-down counter 38 returns to zero, which happens when a number of pulses ZD that equals the number of pulses ZC previously stored when the tool was lifted again have appeared at the output of AND gate 36, when, that is, tool 4 has regained the position at which its lifting was initiated.

Up-down counter 38 will then be blocked and gate 40' unblocked, so that consuming device 42 will again receive pulses ZD. The state described above will accordingly commence again.

FIG. 6 illustrates the different signals that occur during vibrations while diode 13b and phototransistor 14b are at the boundary between an opaque and a transparent zone, with diode 13a and phototransistor 14a on the other hand being on different sides of an opaque zone.

In this case, obviously, A will equal 0 while B will supply a signal indicating a transition from an opaque to a transparent zone. In a device of the known type, signal B will mean that disk 10 continues to rotate and tool 4 to drill.

It will be evident on the other hand that, in the device in accordance with the invention, the outputs QMA1 and QMA2 of monostables MA1 and MA 2 will remain at zero, so that signals XA(1) and YA(1) will also remain at zero.

Signals ZD(1) and ZC(1) will then each generate a pulse for each period of B, pulses that are out of phase.

It will then be immediately evident from FIG. 3 that up-down counter 38 will oscillate between the values 0 and 1. The value will be 1 when a pulse ZD appears and is accordingly not transmitted to consuming device 44.

The device in accordance with the invention accordingly makes it possible to tell precisely what vibrations have occurred and whether the tool has been reversed as well as the depth that it has arrived at. By placing two-way switch 18 in position 2 it will also be possible to determine the height to which the tool has been raised from any position whatever in order to free it.

The present specification and claims are of course intended solely as illustrative of one or more potential embodiments of the invention and should not be construed as limiting it in any way. The invention may accordingly be adapted and modified in many ways without deviating from the theory behind it or exceeding its scope of application.

Figure 2:
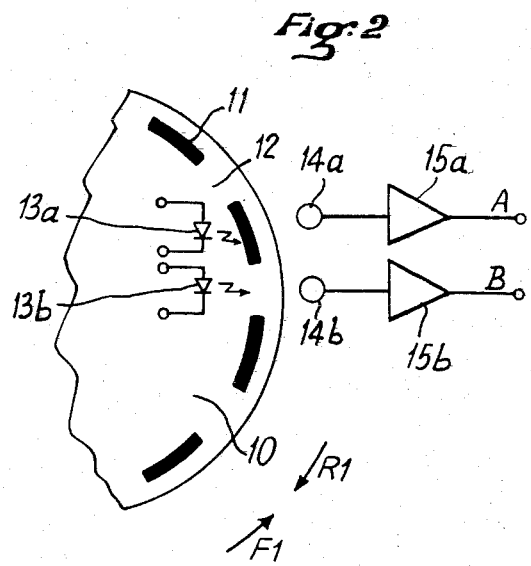
FIG. 2 illustrates a known type of sensor that can be employed in the device in accordance with the invention.

The system illustrated in FIG. 3 can in particular be adapted to any other application beside a drilling tool and may accommodate signals derived from another type of sensor than that illustrated in FIG. 2.

We claim:

1. A device for determining the position of a moving part even when the part is subjected to vibrations which are not to be included in the position determination, comprising:
   sensor means coupled to the part for supplying a first signal, A, which alternates between logic values 0 and 1 as the part moves and a second signal, B, which alternates between logic values 0 and 1 out of phase with the first signal, A, as the part moves;
   monostable circuit means responsive to said first and second signals for generating front detecting pulses QMA1, QMA2, QMB1, and QMB2, wherein QMA1 is generated in response to a rising front of said first signal A, QMA2 is generated in response to a descending front of said first signal A, QMB1 is generated in response to a rising front of said second signal B and QMB2 is generated in response to a descending front of said second signal B;
   a first logical circuit means responsive to said front detecting pulses for generating a downcounting pulse, ZD, such that ZD satisfies the logic equation:

$$ZD = \overline{XA} \cdot \overline{YB},$$

wherein
   $XA = (QMA1 \cdot \overline{B}) + (QMA2 \cdot B)$ $YB = (QMB1 \cdot A) + (QMB2 \cdot \overline{A});$ up-down counter means responsive to said downcounting pulse ZD for detecting oscillation of the first and second signals supplied by said sensor means when said part is subjected to vibrations; and
   gate means coupled to said first logical circuit means and responsive to said up-down counter means for transmitting said downcounting pulse ZD to a consuming device when said up-down counter is in a zero count state and for blocking said downcounting pulse ZD when said up-down counter is not in a zero count state.

2. A device according to claim 1 wherein said up-down counter means is responsive to said downcounting pulse ZD only when said up-down counter is not a zero count state.

3. A device according to claim 2 wherein said up-down counter means includes a NOR circuit for detecting the zero count state and an output of said NOR circuit is connected to one input of an OR circuit whose output causes said up-down counter means to count down while a second input of said OR cirucit receives said downcounting pulse, ZD.

4. A device according to claim 3 wherein the output of said NOR circuit is connected to said gate means for controlling the blocking/transmitting operation of said gate means.

5. A device according to claim 1 further comprising:
   a second logical circuit means responsive to said front detecting pulses for generating an upcounting pulse, ZC, such that ZC satisfies the logic equation:

$$ZC = \overline{YA} \cdot \overline{XB}$$

where
   $YA = (QMA1 \cdot B) + (QMA2 \cdot \overline{B}),$ and
   $XB = (QMB1 \cdot \overline{A}) + (QMB2 \cdot A);$ and
   said up-down counter means counts up in response to said upcounting pulse, ZC.

6. A device according to claim 5 wherein said sensor means includes a rotary disc having alternating opaque and transparent sections.

7. A device according to claim 1 further comprising a drilling tool coupled to said moving part.

8. A device according to claim 7 wherein said sensor means is coupled to winch means for raising and lowering said drilling tool.

* * * * *